3,772,436
DIAGNOSTIC METHOD FOR DETERMINATION OF LACTASE DEFICIENCY USING RADIOACTIVE LACTOSE
Edward Shanbrom, Santa Ana, Calif., assignor to Baxter Laboratories, Inc., Morton Grove, Ill.
No Drawing. Filed Mar. 1, 1971, Ser. No. 119,959
Int. Cl. A61k 27/04
U.S. Cl. 424—1                    3 Claims

ABSTRACT OF THE DISCLOSURE

A diagnostic test for the determination of lactase deficiency which consists of oral administration of two doses of lactose, which may be radiolabeled, the second said dose including a dose of lactase enzyme, and measurement of the blood glucose level and/or the radiolabeled carbon dioxide in the expired breath following each said administration.

---

This invention relates to a novel diagnostic method and procedure and, more particularly, to a screening test for the determination of lactase deficiency.

World food shortages are among the greatest challenges of this centrury. One of the most ideal foods from the standpoint of overall nutrition is milk. As a matter of fact, milk has often been referred to as man's most nearly perfect food. Milk is widely distributed and, where not available, it can be conveniently shipped and stored in the form of dried or powdered milk. Milk solids, which constitute on the average about 11% to 13% of the fluid whole milk, contain a desirable balance between fat, protein and carbohydrate, with the carbohydrate being essentially lactose or milk sugar.

In considering carbohydrate nutrition, the problem of enzyme deficiencies has attracted extensive attention during the past decade. In particular, it is known that the disaccharide, lactose, is not hydrolyzed primarily in the intestinal lumen, but rather after its entry into the intestinal mucosal cells. It is within these cells that th ehydrolytic enzyme lactase is found. Ordinarily, the activity of the naturally occurring enzyme lactase is more than adequate to hydrolyze all of the ingested lactose into the more readily absorbable monosaccharides glucose and galactose. Lactase activity generally is high in infants but tends to decline with age. This lactase deficiency produces a condition known as lactose intolerance, the primary symptoms of which are bloating, abdominal cramps and diarrhea.

The condition of lactose intolerance, which is associated with lactase deficiency, has been found to be more prevalent in certain racial groups than others. As noted by a recent article in the J. Amer. Med. Assn., 213, No. 13, pp. 2257–60 (1970), populations in which the majority of adults have been found to be lactase deficient include African Negroes, Australian Aborigines, Chinese, Indians of North and South America, New Guinea natives, Filipinos and Thais. It will be readily appreciated that included among these racial groups are populations in which food shortages are widely prevalent. However, with significant proportions of these groups being lactase deficient, one of the most otherwise ideal food products, namely milk, cannot or should not be supplied generally unless supplemented with lactase enzyme administration. Of course, for those specific individuals which are found to be lactose tolerant, which is associated with a lactase sufficiency, intake of milk and lactose-containing milk products is to be encouraged. Consequently, an accurate and convenient method of diagnosis of lactase deficiency would find much use in practice.

The conventional method of determining lactase deficiency, known as the lactose tolerance test, is similar to the oral glucose tolerance test and measures the rise of blood sugar level following oral administration of the sugar. In practice, a standard oral glucose tolerance test is also performed to provide a basis for comparison. In these tests, fasting blood and urine specimens are first obtained. Solutions containing up to about 100 grams of glucose (or lactose, as the case may be) are then orally administered and blood and urine specimens which are periodically collected over the following three hour period are analyzed. If lactase activity is present, the lactose will be hydrolyzed to glucose and galactose and the resultant lactose tolerance curve will be similar to that obtained for glucose with a rapid rise in the blood sugar level. With lactase deficiency, the curve will be flat with a rise not exceeding about 20 milligrams per 100 milliliters over the fasting level.

Recently, a lactose tolerance test was reported which has certain advantages over the aforesaid standard lactose tolerance test. In this test, reported in Internal Medicine and Diagnosis News, Oct. 1, 1970, the specific activity of $^{14}CO_2$ in the exhaled breath is measured after oral administration of lactose-1-$^{14}C$ following an overnight fast. If the radioactively labeled lactose is hydrolyzed and the resulting glucose metabolized to carbon dioxide and water, radioactive carbon dioxide will appear in the expired breath. While this test is more accurate than the standard lactose tolerance test, it retains a disadvantage of the latter test in that it does not distinguish between lactase deficiency, intestinal malabsorption of lactose, or some underlying pulmonary pathology or dysfunction. A biopsy is required to determine lactase deficiency according to these prior conventional methods.

In accordance with the present invention, an improved diagnostic method is provided for determining lactase deficiency. In brief, the diagnostic method comprises the oral administration of a predetermined amount or dose of lactose or radiolabeled lactose to a fasting subject followed by analysis of blood glucose and/or exhaled radiolabeled $CO_2$. Oral administration of lactose or radiolabeled lactose is then repeated except that in the second administration it is combined with administration of a predetermined amount or dose of lactase enzyme. Again, the administration is followed by analysis of the blood glucose and/or exhaled radiolabeled $CO_2$.

If the subject fails to show normal laboratory values following the first lactose administration, lactase deficiency, intestinal malabsorption of lactose, or pulmonary pathology is presumed to be present. If the laboratory values return to normal following the second lactose administration (together with the lactase enzyme), lactase deficiency is confirmed. No change in laboratory values is indicative of an intestinal malabsorptive state or impairment in transport mechanisms while discordant values suggest pulmonary obstructive disease.

In general, from about 50 to about 100 grams of lactose preferably is given in each administration in the diagnostic method of the present invention. Amounts of lactose outside the aforesaid range can be administered but those levels specified are convenient and eminently suitable. Doses in excess of 100 grams are generally unnecessary and doses much below 50 grams will not pick up all lactase deficient individuals. The amount of lactase enzyme given in the second administration is generally equivalent to that quantity needed to hydrolyze the lactose which is then administered and can vary within limits, depending in part upon the lactase activity or unitage of the particular enzyme preparation employed. In general, a dosage of from about 100 mg. to about 1 gram of a lactase enzyme preparation is desired.

A preferred radiolabeled lactose is lactose-1-$^{14}C$, which is commercially available. Upon hydrolysis by the lactase enzyme to glucose and galactose and further metabolism in the body, the lactose-1-$^{14}$C will produce $^{14}CO_2$ in the exhaled breath, which can be measured by conventional radioactive counting equipment.

The blood glucose level can be measured by any conventional method, for example, the glucose oxidase method as described in U.S. Pat. 3,404,069, or the ortho-toluidine method as described in Clin. Chem. 8, pp. 215–235 (1962) and Clin. Chem. Acta 7, pp. 140–143 (1962).

Since in the stomach the gastric fluid provides strongly acidic conditions in the pH range of about 1 to 3, it is preferred to orally administer a lactase enzyme preparation which is acid-active and acid-stable. A preferred lactase enzyme preparation is one such as that described in the co-pending application of Cayle, Ser. No. 812,348, filed Apr. 1, 1969, the disclosure of which is incorporated herein by reference. Said co-pending application describes a lactase enzyme preparation which is stable in the range of pH 2 to 9, exhibits at least about 90% of its activity at pH 2.5 to 5.0 and contains at least about 50,000 lactase units per gram of enzyme preparation. The enzyme is extracted from a culture of *Aspergillus niger* grown under aerobic fermentation conditions.

Other suitable acid-active, acid-stable lactase enzyme preparations can be obtained from the growth cultures of related microorganisms of the *Aspergillus niger* group, for example, *Aspergillus awamori*, *Aspergillus foetidus*, *Aspergillus phoenicus*, and *Aspergillus usami*.

The following examples will further illustrate the invention defined and claimed herein although the invention is not limited to these specific examples.

EXAMPLES

Three human patients, each having previously known lactase deficiency, were screened for lactase deficiency according to the following procedure:

The patient, following overnight fasting, is given a loading dose of 50 grams of lactose which has been radioactively labeled with $^{14}$C. Blood glucose levels are then monitored for a period of two hours. The $^{14}CO_2$ in the patient's expired breath also is calculated by utilizing radioactive counting equipment during the two hour period. The lactose loading test is then repeated except that a calculated amount of Wallerstein Lactase-LP (200,000 lactase units/gram) is added to the lactose immediately before it is swallowed by the patient. Blood glucose levels are again monitored and the $^{14}CO_2$ in the patient's expired breath calculated during a two hour period following the administration. The following table sets forth the results obtained in the foregoing screening procedure:

TABLE OF EXAMPLES

| | Glucose maximum rise, mg. percent | | $^{14}CO_2$ percent | | Symptoms | | Lactase dose, grams |
|---|---|---|---|---|---|---|---|
| | Pre | Post | Pre | Post | Pre | Post | |
| Patient Example No.: | | | | | | | |
| 1 | 3 | 25 | 0.2 | 1.7/3.1 | Cramps, some diarrhea | None | 3.0 |
| 2 | 10 | 38.5 | 0.4 | 2.1 | Some diarrhea | do | 2.0 |
| 3 | 15.5 | 41 | 1.7 | 2.8 | do | Some diarrhea, but less severe than pre. | 1.5 |

NOTE.—Pre=Before administration of lactase; Post=After administration of lactase.

That the foregoing screening procedure confirms the previously known lactase deficiency of the three patients is evident from the fact that in the normal person (lactose tolerant, lactase sufficient), a minimal glucose rise of 20 mg. percent is observed and the normal $^{14}CO_2$ output rises above 1.9 mg. percent during the two hour period.

Various other examples and modifications of the aforesaid examples can be made after reading the foregoing specification and claims appended hereto, by the person skilled in the art without departing from the spirit and scope of the invention. All such modifications and further examples are included within the scope of the invention as defined in the following claims.

What is claimed is:

1. A diagnostic test for the determination of lactase deficiency comprising oral administration of from about 50 to about 100 grams of material selected from the group consisting of lactose and radioactive lactose and measurement of blood glucose level or exhaled radioactive $CO_2$ followed by another oral administration of from about 50 to about 100 grams of material selected from the group consisting of lactose and radioactive lactose in combination with sufficient lactase to hydrolyze said latter administered lactose and measurement of blood glucose level or exhaled radioactive $CO_2$.

2. A diagnostic test of claim 1 in which the lactase is an acid-active, acid-stable enzyme obtained from the growth culture of a microorganism from the *Aspergillus niger* group.

3. The diagnostic test of claim 1 in which radioactive lactose-1-$^{14}$C is employed.

References Cited

Chemical Abstracts, 1955, vol. 49, col. 10458(e), Carleton et al.

BENJAMIN R. PADGETT, Primary Examiner

U.S. Cl. X.R.

23—230 B; 250—106 T; 424—180, 361